United States Patent [19]

Stouffer

[11] 4,250,799
[45] Feb. 17, 1981

[54] SWEEPING AIR STREAM APPARATUS AND METHOD

[75] Inventor: Ronald D. Stouffer, Silver Spring, Md.

[73] Assignee: Bowles Fluidics Corporation, Silver Spring, Md.

[21] Appl. No.: 30,794

[22] Filed: Apr. 17, 1979

[51] Int. Cl.³ .............................................. B60H 1/14
[52] U.S. Cl. ...................................... 98/2.08; 98/2.09; 98/2.19; 98/40 N; 239/284 R
[58] Field of Search ............... 98/2.08, 2.09, 2.19, 98/40 R, 40 E, 40 N, 41 R; 137/829, 830, 624.14; 239/284 R, 101, 102

[56] References Cited

U.S. PATENT DOCUMENTS

| | | | |
|---|---|---|---|
| 2,096,901 | 10/1937 | Knecht | 98/2.09 |
| 2,894,443 | 7/1959 | Rasmussen | 98/2.08 |
| 3,177,794 | 4/1965 | Laing | 98/2.09 |
| 3,320,869 | 5/1967 | Schach | 98/41 R |
| 3,342,198 | 9/1967 | Groeber | 137/829 |
| 3,746,044 | 7/1973 | Velicer et al. | 137/830 |
| 3,927,607 | 12/1975 | Jobst | 98/2.09 |
| 4,157,161 | 6/1979 | Bauer | 137/830 |

Primary Examiner—Henry C. Yuen
Attorney, Agent, or Firm—Jim Zegeer

[57] ABSTRACT

In an automobile air flow system, air is forced through an air outlet element or nozzle in a sweeping air stream pattern by an oscillatory member that is supported for air initiated oscillatory movement in the flow path of the air from the source. The oscillatory member is proportioned with respect to the cross-sectional size of the outlet such that at any extreme of its oscillatory movement it does not physically contact any other structural member. In a preferred embodiment, the oscillatory member includes an impingement element and is supported by a spring, the rate of oscillation of the impingement member being directly related to the spring constant and the weight of the impingement member. In a highly preferred embodiment of the invention for the defrost system of the automobile, the oscillatory impingement member is in the flow channels to the windshield defrost system and causes uniformly swept air jet to sweep over the windshield so that the intensity of the heated air, because of minimal mixing with ambient, is maximized at the point of impact of the air stream on the windshield which is uniformly distributed by the sweeping action of the jet stream. This is accomplished by having the sweep frequency low enough compared to the velocity of the jet so that the wavelength is long compared to the nozzle to windshield distance. The oscillatory element can be in the shape of an inverted "T" or "L" wherein the stem of the "T" or "L" is adjustably held a preferred angular orientation relative to the direction of air flow to provide a simple and efficient flow controller.

8 Claims, 8 Drawing Figures

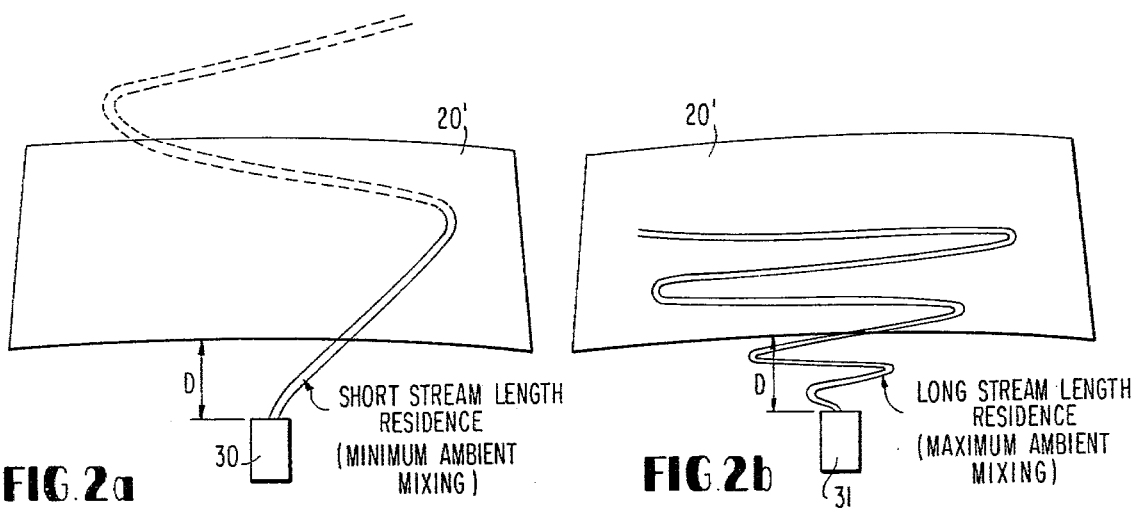
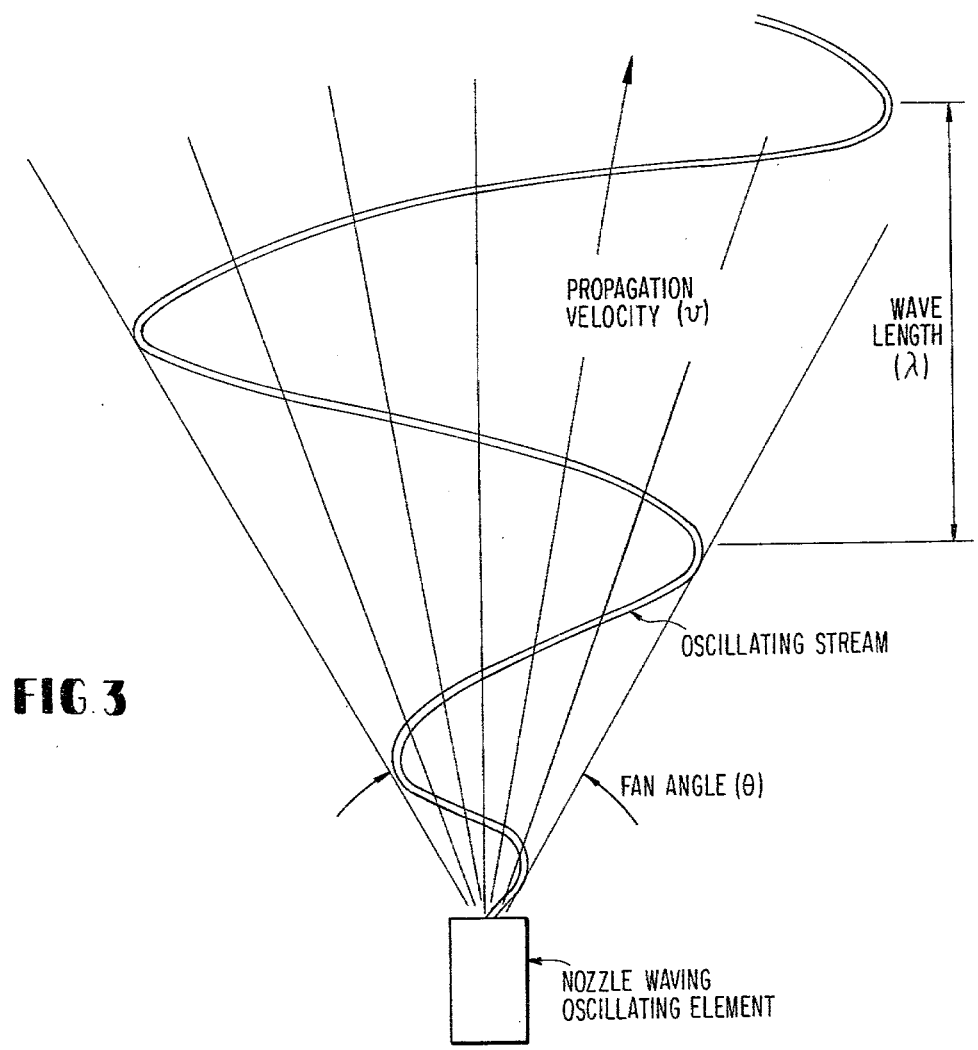

SWEEPING AIR STREAM APPARATUS AND METHOD

BACKGROUND AND BRIEF DESCRIPTION OF THE INVENTION

The invention is directed to the air flow systems in automobiles and in particular to the treated air flow systems in automobiles such as defrosters, air conditioning and heating systems.

In automobile systems, the defrost system and the air conditioning system as well as the heating system typically are all contained under the dashboard and prior art efforts to use standard (feedback) type fluidic nozzles while, basically, functionally good in sweeping a jet of air across the windshield, the physical size required by the fluidic element is much too large to fit within the dash, particularly in small and downsized automobiles. For example, the outlet of some automobiles ducting is about 3×5 inches. If one were to use the smaller 3" dimension for the power nozzle width (W) of the fluidic element, the resultant length of the nozzle would be too long. Experiments with the resultant sweeping air jet from such a large element to discover more about its uniformity characteristics in the air showed that the frequency standard of the oscillator is in the order of 10 $H_z$ and at an air velocity of about 100 feet per second, the characteristic wavelength is in the order of about 10 feet which is satisfactory.

The operational basis for the oscillating jet is that a concentrated jet would be uniformly swept over the windshield so that the intensity of the heat, because of minimal mixing with ambient, would be maximized at the point of impact of the air stream but would be uniformly distributed by the sweeping action. In order to accomplish this, the sweeping rate or frequency of the air stream must be low enough compared to the velocity of the air jets so that the wavelength is long compared to the nozzle. When the wavelength is long, a small portion of the stream resides in the ambient air before impacting the windshield. On the other hand, with a short wavelength much of the stream resides in the ambient air, producing severe mixing with the ambient, which for defrost purposes tends to defeat the purpose at hand. However, for air conditioning purposes, a low sweeping rate is desired in the initial cool down phase of the air confined within the automobile and the, after the vehicle has been cooled down, a mixing with the ambient is desired so as to maintain the temperature. This dual sweep frequency concept is also desirable for the heating of the vehicle that is to say, the initial heating is obtained by a low rate or frequency of sweeping of the air stream in the passenger compartment in order to more rapidly cool down or heat up the passenger compartment and then, after a short time interval the sweep rate is increased to thereby produce mixing of the freshly cooled or heated air with the air in the passenger compartment.

In order to satisfy the requirement of small space and to minimize ambient mixing for defrost operation which is undesirable since it lowers the thermal energy of air impacting the windshield, the present invention provides an oscillator whose frequency is independent of the air stream properties and whose frequency is characteristically low. However, the invention also provides an oscillator whose frequency can be changed dependant upon time and/or temperature to achieve an initial low frequency of operation so as to assure a rapid heating and/or cooling of the passenger compartment and subsequently, a higher frequency of oscillation to assure a better mixing characteristic (in contrast to the defrost operation) after the passenger compartment has been cooled or heated for a selected period of time.

The present invention provides a vibrating reed air stream oscillator, preferably constituted by a thin resilient reed in the shape of an inverted "T" which is supported in cantilevered fashion from the stem of the "T" in the duct. This provides an air initiated oscillation mechanism which is extremely reliable, very low in last cost and can be installed or incorporated in existing defrost systems without significant structural modification and which does not require any additional space and, in fact, can reduce the space requirements since it results in a much more efficient and rapid defrost of an automobile windshield by concentrating the heated air rather than diffusing it over a wide or long path. That is to say, instead of a diffuser of wide angles, the air stream is swept over the wide angle and, in some cases, a single defrost air outlet adjacent to the windshield can accommodate the entire windshield.

BRIEF DESCRIPTION OF THE PRIOR ART

In Kakie et al. U.S. Pat. No. 3,832,939 and U.S. Pat. No. 3,745,906, a defroster is disclosed in which the defroster nozzle is funnel shaped leading from a wide outlet opening to a source of hot air which is sprayed on the windshield through the outlet opening, the path of the fluid jet issuing from the defroster nozzle being periodically switched from one side wall of the defroster nozzle or funnel shape being used to provide a wall attachment affect between the air jet and the side walls of the defroster nozzle. According to U.S. Pat. No. 3,832,939, feedback channels of a typical fluidic element are utilized to control the sweeping action so that the device operates in typical fluidic fashion. However, as noted above, the extra space requirement required for such devices in the small but crowded space under the typical automobile dashboard structure precludes uses of such devices even when their frequency can be made quite low. For example, the standard fluid feedback paths for controlling the oscillatory frequency occupy quite a large amount of space. The use of fluidic or mechanical oscillator to control the openings of the feedback passages likewise require significant space and/or complexity both in the structure itself manufacture of some. The use of a motor for oscillating a vane or nozzle is likewise unduly complex and requires significant design departures and changes in the physical structure. Even oscillating the funnel itself or vanes in the device to cause a shifting of the air or of a valve element for causing the shift or sweep of air all require additional complex mechanism which add weight and complexity to the vehicle and would appear to be quite difficult to service. There are also prior art uses of heat deflectors for registers in which there is some air initiated rotary element such as the turbine fan shown in Klein U.S. Pat. No. 365,078 which serves to distribute the air over a large area. In some cases, such as Crowley, U.S. Pat. No. 2,154,731, special bendable deflectors are provided in attempts to evenly distribute the heated air over a windshield.

The oscillating element of the present invention solves the problems in a simple efficient and inexpensive manner.

According to the invention an oscillatory member is supported in the air outlet element of an automobile airflow system, said oscillatory member being constituted by a resilient reed secured at its downstream end proximate the center of the air outlet element, the free upstream end may have an air impingement surface and is proportioned with respect to the cross-sectional size of the outlet element that during oscillatory movement there is no physical contact with any structural portion of the outlet elements. In defrost/defog systems, the frequency of oscillation is such that the wavelength is long relative to the distance from the outlet element to the windshield surface thereby minimizing mixing of defrost/defog air with ambient air. In heating and air conditioning systems higher initial frequencies, and hence shorter wavelength, are desireable to obtain better mixing to obviate hot or cold spots. Rapid heating/cooling of the passenger compartment, initially requires subsequently lower frequency-longer wavelength.

BRIEF DESCRIPTION OF THE DRAWINGS

The above and other objectives, advantages and features of the invention will become more apparent from the following specification when considered in conjunction with the accompanying drawings wherein:

FIG. 2a illustrates the sweeping rate (frequency) of the air stream must be low enough compared to the velocity of the jet so that the wavelength is long compared to the nozzle to windshield distance, FIG. 2b shows that when the wavelength is long, a small portion of the stream resides in the ambient air before impacting the windshield, FIG. 3 illustrates the relationship between the air stream wavelength, the velocity of propagation and the frequency of oscillation.

DETAILED DESCRIPTION OF THE INVENTION

Figure 1:
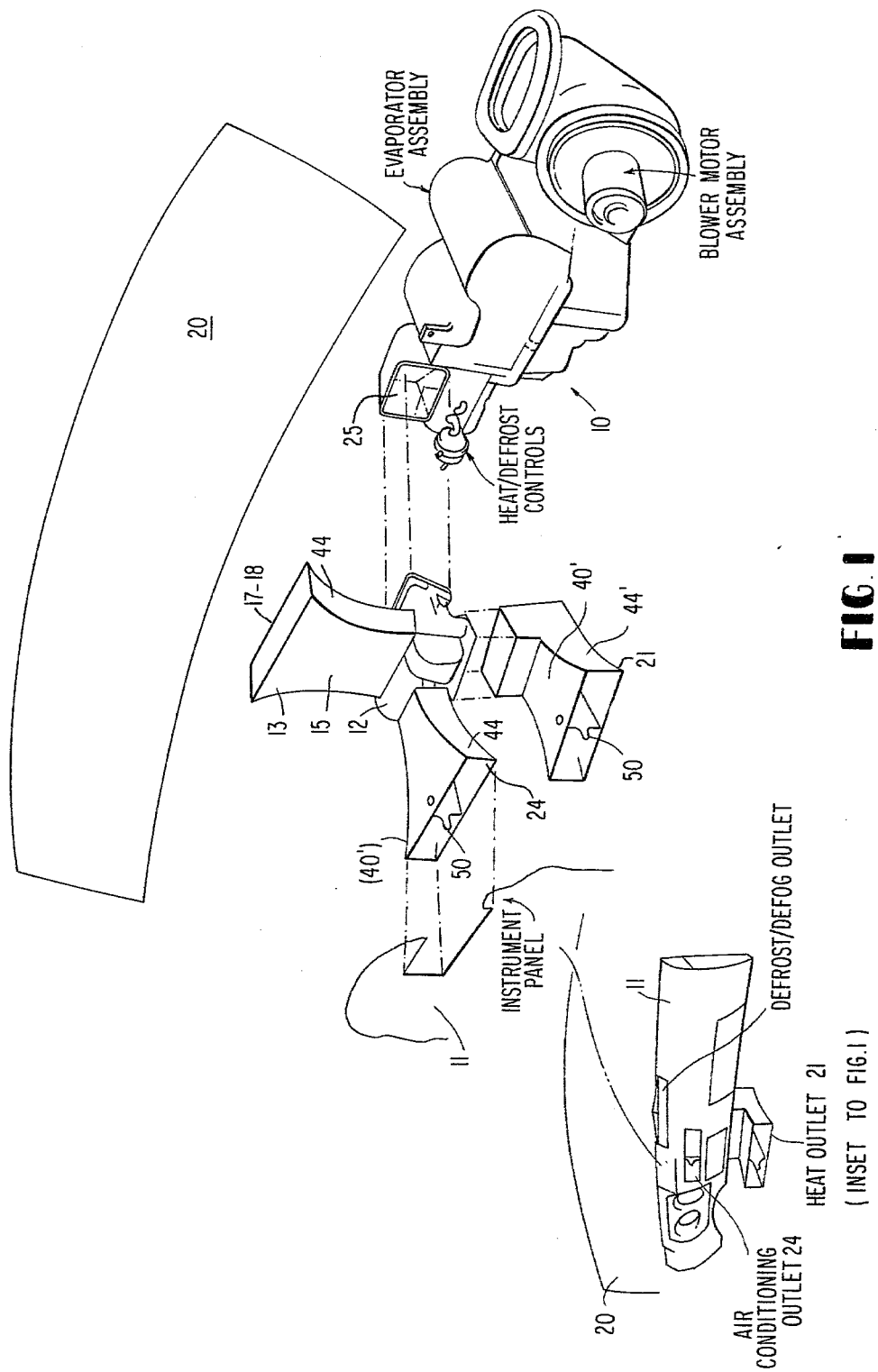
FIG. 1 (and the inset thereto) is an isometric perspective view of an automobile defrost system and its proximity to the windshield of an automobile to which the invention has been applied.

As shown in the embodiment illustrated in FIG. 1, a defroster according to the invention includes a conventional heater 10 which is usually installed underneath the dashboard or instrument panel 11 connected, via main duct work 12 to defrost-defog nozzle 13. The nozzle 13 is connected via duct 15 to main ductwork 12 but, it will be appreciated that separate passage ways or ducting may be utilized for connecting outlet nozzles to car heater 10 in the event two nozzles are used. Nozzle 13 has an outlet opening 17, juxtaposed so as to direct air over the inner surface of windshield 20.

Air for heating the interior of the passenger compartment is delivered through separate nozzle 21 for directing air from common duct 12 to the interior compartment of the vehicle. It will be appreciated that control linkages and/or cables for controlling valving in duct 12 for directing all the air to outlet nozzle 13 for defrost purposed, and/or to the outlet nozzle 21 for heating the interior compartment of the vehicle are standard control instrumentalities and hence do not per se form a part of the present invention. By the same token, in some automobiles the outlet air nozzle 21 can be connected to a source of outside air for venting purposes.

Still reffering to FIG. 1, there is shown air conditioning outlet nozzle 24 which is connected to a conventional automobile air conditioning unit and air circulation system 25, it being appreciated that outlet 21 can also be used for supplying air from the air conditioning unit to the passenger compartment. The heat/defrost door or valve assembly and motor, the air conditioner evaporator case and assembly as well as the blower motor and an intake are conventional and not illustrated in detail.

The invention particularly utility to windshield defrost systems and will be described with particular reference to that automobile air flow system.

Most fluidic nozzles have a characteristic wavelength $\lambda$ which is a constant for a given size nozzle, constant over a variety of pressures and has a frequency characteristic which is linear with velocity. The wavelength is a function of the velocity of propagation and the frequency of oscillation so that $$\lambda = V/F$$

wherein:

$\lambda$ equals the wavelength of the oscillating stream,
V equals velocity of stream propagation and
F equals the frequency of oscillation.

Figure 5:
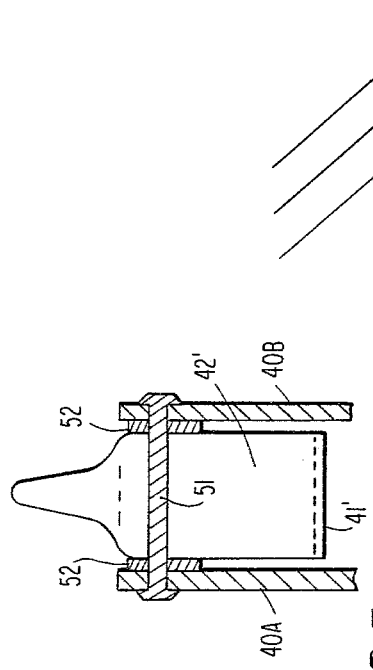
FIG. 5 is a modification of the oscillatory element shown in FIG. 4b to which an oscillatory rate control function has been applied for controlling the rate of oscillation of the oscillating element.

FIGS. 2a and 2b illustrate the patterns on a automobile windshield 20' of the operational basis for oscillating the air jet such that a concentrated jet is uniformly swept over the windshield 20' so that the intensity of the heat, because of minimal mixing of heated air with the ambient air, will be maximized at the point of impact of the air stream on the windshield and this affect is uniformly distributed by the sweeping action over the windshield surface. The relationship of the sweeping rate (frequency) of the air stream issuing from nozzle 30 (FIG. 3a) and the nozzle 31 (FIG. 2b) respectively to windshield distance D is illustrated in FIGS. 3a and 3b. When the wavelength is long relative to distance D, is a small portion of the stream resides in the ambient air just before impacting the windshield. This illustrated in FIG. 3a and labled "short stream length residence" (minimum ambient mixing: When the wavelength is short relative to distance D a much larger portion of the air stream resides in the ambient air before impacting the windshield, this is illustrated in FIG. 2b and legended "long stream length residence" (maximum ambient mixing). For the defrost operation, the operation illustrated in FIG. 3a is used. As discussed earlier herein in connection with the improvements in efficiency in the cooling and heating of the passenger compartment, after the initial heating or cooling of the passenger compartment has taken place it is desirable that maximum ambient mixing condition be brought into play. However, the short stream length residence for minimum ambient mixing is desirable in the heating and cooling situation in the initial heating or cooling cycle of the passenger compartment. Reference is make to FIG. 5 which discloses the control over the oscillating element to achieve a situation shown in FIG. 2a and FIG. 2b.

THE OSCILLATOR ELEMENT OF THIS INVENTION

Figure 4B:
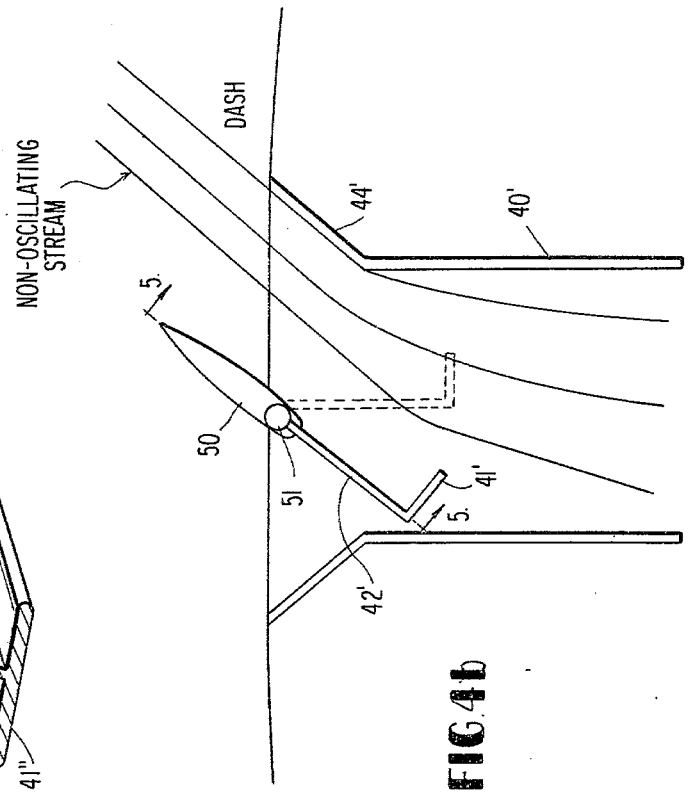
FIG. 4a illustrates a fixed oscillating element primarily for defrost/defog use and FIG. 4b illustrates a manually adjustable oscillatory element flow director, both figures being according to preferred embodiments of this invention.
Figure 4A:
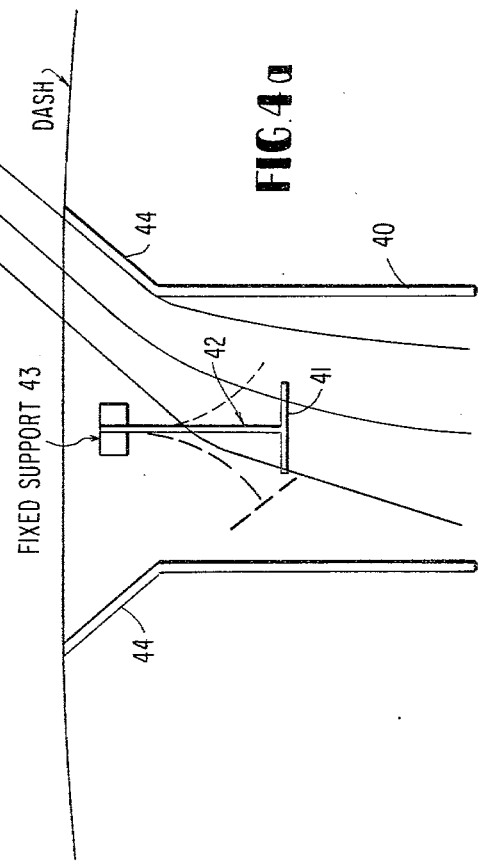

Referring now to FIG. 4a, the duct or channel 40 carrying air under pressure from the blower in the defrost unit 10 is directed to an oscillatory impingement member or element 41. Oscillatory impingement element 41 is supported for oscillatory movements by a thin metal reed 42, which together with the oscillatory impingement element 41 are in the shape of an inverted "T" which is cantileverly supported from the stem of the "T" at a fixed support 43.

Air passing through duct 40 will impinge on the cross part of the "T" shaped element and initiate oscillation thereof. The spring 42 (which is the stem part of the "T" reed) and the mass (the cross part or oscillatory impingement member 41) act together as a spring-mass system which is forced to oscillate by the air flowing by it. The stem 42 of the "T" reed acts like a moving wall to deflect the exiting air stream in an oscillatory, sweeping manner across windshield 20.

The frequency is constant for any air velocity since it is determined primarily by the spring-mass characteristics of the "T" system. Therefore, it is easy to select parameters to produce a low frequency (say about 4 hertz $H_z$) so that the oscillating air streams wavelength is $$= V/F = 100 \text{ feet per second}/4 \text{ hertz} = 25 \text{ feet}$$

Furthermore, the overall length of the device can be made very short so that under the dash space is conserved and may even be reduced. No additional or special requirements are needed for the power source or feed ducting as it operates over extremely wide range of air flows.

The same vibrating reed system can be used to cause the sweeping motion of the air stream entering an automobile passenger compartment for the purpose of more efficiently conditioning the air. Thus, as described earlier herein, the air stream can initially have a long wavelength, the oscillatory frequency of vibrating reed oscillatory impingement member 41'-42' being low, so that the short stream length provides good throw to more efficiently heat up the spaces remote from the outlet nozzle and, after a period of time changed to a shorter wavelength which provides greater mixing (see FIG. 2b) with the ambient air. In FIG. 4b the oscillating element has the shape of an "L" with the stem 42' being a thin metal reed and the cross or leg 41' of the "L" being impinged upon by the air flow in passage way 40'.

There are times when it is desirable in the heating and cooling application that the air stream be confined to a particular locations in the passenger compartment, such as to the driver's side. As described above, the oscillatory impingement member can be captured at a selected position in the outlet nozzle element to prevent oscillation thereof and to cause air to issue from the outlet in a non-sweeping air stream pattern.

Figure 6:
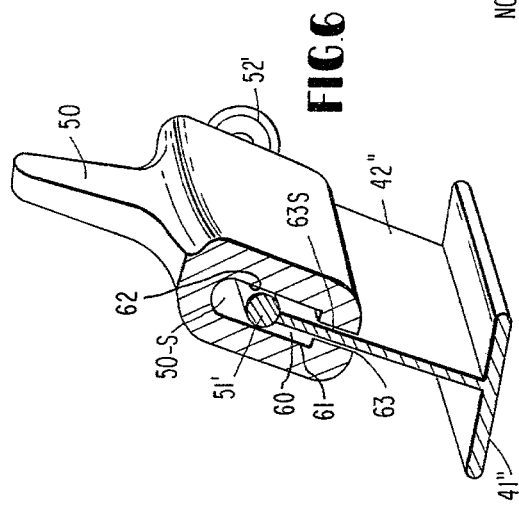
FIG. 6 is a detailed cross-sectional view of the friction held manual control arrangement of FIG. 4b.

As shown in FIG. 4b and FIG. 6 the air oscillating element is mounted on a lever 50 which projects a short distance beyond the end of the nozzle so as to be accessable to the passenger compartment to serve as a flow controller and also as a pointer or indication of the direction of air flow. Flow director lever 50 is mounted on a pivot pin 51 extending between walls 40-A and 40-B of air passageway 41 and one or more friction elements or washers 52 friction elements 52, which may be integrally formed on the walls 40-A and 40-B, serve to retain lever 50 and the oscillatory member 41'-42' at any passenger selected position in the air stream. In the position illustrated in full lines in FIG. 4b, the air stream is deflected or directed to flow, to the right and is not oscillated or swept. When lever 50 is centered and substantially aligned with the air passageway 40', oscillatory element 41'-42' is set into oscillation by the air flow through the passageway therby imparting a sweeping movement to the air stream. Since the cross member 41' is more on one side of the passageway, more air will be directed to the opposite side and therfore can serve as a means to favor the distribution of air in the passenger compartment to the driver's side, if desired.

The oscillatory rate change feature is illustrated in FIG. 6. According to this feature the length of the reed element 42 is adjusted to adjust the rate of oscillation. Flow director lever 50 is provide with an elongated slot 60 which has side walls 61 and 62 which frictionally engage pivot 51' to which the stem 42" of the oscillating element is secured (it being appreciated that the pivot may be integrally formed on the end of the stem). The stem 42' passes through a slit 63 in the end of lever 51. The surfaces 63S of slit 63 slidingly engage the surfaces of the stem 42" to thereby lengthen or shorten the length of the spring and hence lower and raise the oscillatory frequency by pulling lover 51' out or pushing it in, respectively. Friction washer or elements 52 also serve to reating the adjusted position of lever 51' with respect to stem 42".

It will be appreciated that since the inverted "T"—the e.g., the oscillatory impingement element, is only required to oscillate at relatively low rates, the movement is limited thereby minimizing the material problem. And in view of the relative simplicity of and compactness of the device, it can reduce the space under the dash. Since in the preferred embodiment of the invention, the cross-sectional area of the oscillatory impingement element 41 is smaller than the cross-sectional area of the duct 40 to permit free movement thereof without impacting on any element, it is completely silent, consumes no power and does not introduce any significant pneumatic impedance and thereby does not unduly load the impeller or blower motor in defrost unit 20.

I claim:

1. In an automobile air flow system under dashboard wherein a source of air under pressure is forced through a channel to an outlet element in said dashboard in a sweeping air stream pattern, the improvement comprising, an air powered oscillatory member, and
means supporting said oscillatory member proximate the center of said outlet element, said oscillatory member being dimensionally proportioned with respect to the cross-sectional size of said outlet element and said channel such that at any extreme of its oscillatory movement in said outlet element it does not physically contact any structural portion of said channel and said outlet element, said oscillatory member being rendered oscillatory solely upon the flow of air from said source through said outlet, said means supporting said oscillatory member includes a spring, means securing said spring at one end to said oscillatory member and at the opposite end to at least one surface of said outlet element, said oscillatory member including an impingement member secured to said spring and wherein the rate of oscillation of said impingement member is related to the spring constant of said spring, the rate of air flow and the weight of said impingement member.

2. The invention defined in claim 1 including means to capture said oscillatory member at a selected position in said outlet element to prevent oscillation thereof and cause air to issue from said outlet in a non-sweeping air stream pattern.

3. The invention defined in claim 2 wherein said means to capture said oscillatory member includes a friction stop, and lever means for adjusting said member to a non-oscillatory position.

4. The invention defined in claim 1 wherein said air powered oscillatory member is in the shape of an inverted "T",
the free end of the stem of said "T" being the sole point of support for said "T" in the air flow, and being down stream of the cross of said "T".

5. The invention defined in claim 1 wherein said air powered oscillatory member is in the shape of an inverted "L",
the free end of the stem of said "L" being the sole point of support for said "L" in the air flow and being down stream of the cross of said "L".

6. The invention defined in claim 1 wherein said oscillatory member has air impingement member having a planar surface which is transverse to the air flow in said channel.

7. The invention defined in claim 6 wherein the rate of oscillation of said oscillatory member is related to the spring constant of said spring, the rate of air flow and the weight of said impingement member.

8. An automobile defrost/defog system including a source of a stream of air, a nozzle having an outlet for directing said stream of air upon the interior surface of an automobile window, the improvement comprising means for sweeping said stream of air back and forth across said interior surface at a frequency such that the wavelength of the sweep is such that there is a short length of air stream between said nozzle and the edge of said interior surface nearest said nozzle and the edge of said interior surface nearest whereby mixing of said air stream with ambient air is reduced, said means for sweeping including an air initiated oscillation member, said air initiated oscillation member being an elongated resilient member having its direction of elongation, when in a state of rest, coaxial with the direction of air flow, and means supporting the downstream end of said resilient member such that the free upstream end is free to sweep back and forth in said air stream at a point upstream of said means supporting said downstream end at the frequency of said sweep, and a weight member on the free end of said resilient member such that the rate of sweeping is related to the spring constant of said resilient member, the rate of air flow and the weight of said weight member.

* * * * *